A. STERN.

TRANSFER MOUNT FOR EMBROIDERY.

APPLICATION FILED AUG. 22, 1917.

Reissued Nov. 27, 1917.

14,399.

Inventor
Arnold Stern,
By his Attorneys
Kenyon & Kenyon

UNITED STATES PATENT OFFICE.

ARNOLD STERN, OF HOLLIS, NEW YORK.

TRANSFER-MOUNT FOR EMBROIDERY.

14,399. Specification of Reissued Letters Patent. Reissued Nov. 27, 1917.

Original No. 1,171,154, dated February 8, 1916, Serial No. 34,824, filed June 18, 1915. Application for reissue filed August 22, 1917. Serial No. 187,714.

*To all whom it may concern:*

Be it known that I, ARNOLD STERN, a citizen of the United States, and a resident of Hollis, in the county of Queens and State of New York, have invented certain new and useful Improvements in Transfer-Mounts for Embroidery, of which the following is a specification.

This invention relates to embroidery, and particularly to designs in embroidery such as initial letters, monograms and the like, wherein manufactured designs, whether machine made or hand made, are produced, for the purpose of being placed, and secured as by sewing, upon articles of fabric.

My improvement consists in the provision of a perishable backing or mount for embroidery designs, the said mount being composed of textile material, which, prior to its employment as a mount, has been treated with a chemical solution to render it destructible at a raised temperature that is non-destructive of untreated material.

In carrying out my improvement I employ textile material as a base or foundation upon which is embroidered a letter or other design. The base or foundation material, however, has first been immersed in a chemical bath, such as a weak solution of sulfuric acid, which has the effect, when the treated material is subsequently subjected to a raised temperature at which the strength or coherence of untreated material is unaffected—the heat being approximately at a temperature of 130° F.—of causing said treated material to become charred or incinerated, and thus capable of removing readily from the embroidery.

In a practical example of my invention, an initial letter may be embroidered upon a treated square or piece of fabric, which may be of cotton, forming a mount or base for said letter, by which it may be kept flat and spread out in its formative lines, thus remaining in convenient, shaped condition for use, such as to be sewn upon a handkerchief or any other article which is to be thus distinguished or adorned. The base or mount having now served its function, is removed by the process of introducing the article, or that portion thereof bearing said base or mount and embroidered letter, into a zone of the required heat, as in an oven, whereupon the treated base or mount, as stated, becomes charred or friable, its texture being destroyed through the heat accentuation of the acid property of incineration, so that with a stiff brush the whole of said base or mount may be swept away from both the embroidered letter and the article upon which said letter has been secured. Hence, by my invention there is provided a new article of manufacture comprising an embroidered letter or design having a form maintaining mount which is destructible through the agency of a degree of heat that exercises no deleterious influence upon the letter or design, nor upon the goods to which it has been secured.

Figure 1:
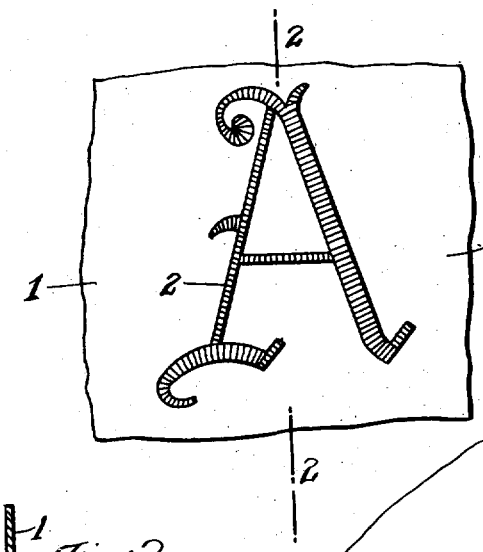
Figure 1 is a plan view of a letter formed by embroidery upon a piece or square of treated material which serves as a base or mount for said letter.
Figure 2:
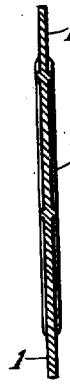
Fig. 2 is a section on the line 2—2 of Fig. 1.
Figure 3:
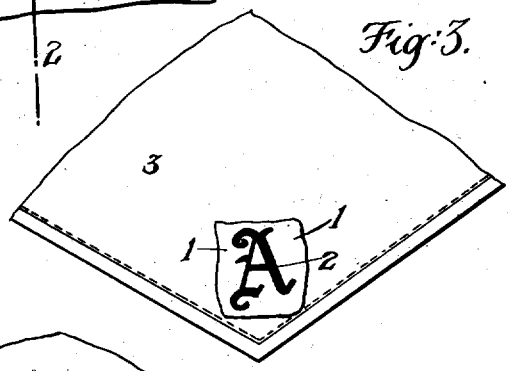
Fig. 3 is a plan view showing the letter with its base or mount sewn upon an article which is thus decorated.
Figure 4:
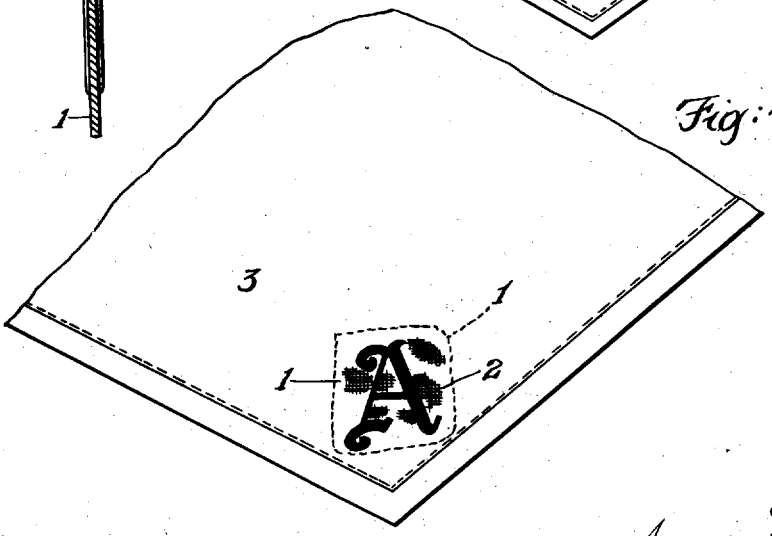
Fig. 4 shows the letter, base or mount and article after subjection to heat which has rendered the base or mount friable by incineration, in this view a portion of the charred base or mount being shown as having been brushed away.

In said drawing, the numeral 1 indicates a piece or square of fabric, which may be a suitable textile material, and which has been dipped in a weak solution of sulfuric acid, and dried. While the strength of said solution may vary within certain limits, I have found that a five (5) per cent. solution gives the desired result. It is important that the acid percentage should be sufficient to attack the fibers of the treated material at normal temperatures, because, for the purposes of my invention, the material must maintain its strength for indefinite periods. Upon the piece of fabric 1, which may be square, as seen, or of other desirable contour, a letter or other design 2 is produced by embroidery, either by machine or hand work. For the particular purpose I have in view, that of marketing mounted embroidery initial letters at a low price, obviously machine work is most desirable.

The embroidery is performed upon the treated mount just as though the mount were the ultimate article, such as a handkerchief, or other article to be permanently adorned with the initial letter. Thus the embroidered letters or other designs, with the mounts upon which they are produced, become individual, integral articles of commerce, the mounts serving the double purpose of supporting and displaying the letters or designs while exposed for sale, and having the further function of enabling the letters or designs to be readily and accurately placed upon the goods or articles, upon which they are to be permanently secured as by sewing.

It will be appreciated that by means of the mount, an initial letter, which unmounted is difficult to arrange in symmetrical form of an article, as 3, upon which it is to be sewn, is conveniently held to its true form, and thus the labor of adjusting its lines, preparatory to sewing in place, is entirely avoided.

When the article, as 3, has had sewn thereto the letter 2 with its mount 1, the united members are subjected to the influence of heat, as in an oven, the temperature not being required to exceed 130° F. and therefore having no injurious effect upon the embroidery, nor upon the article to which sewn. But the treated mount 2 at this temperature, or thereabout, becomes charred or incinerated, due to the accentuation by heat of the acid potency, whereby said mount is easily disintegrated, and may be easily removed as by brushing with a stiff brush, leaving the embroidered initial letter or design in supported relation with its permanent mount, as an act of transference from a disappearing mount.

Another method of employing my improved treated mount may be by subjecting it to heat at the moderately raised temperature indicated, when embroidered with a letter or other design, to render the mount material easily disintegrable; although said mount material, as charred or incinerated under the augumentation by heat of the acid action aforesaid, and therefore rendered friable, maintains sufficient substance to answer the purposes of retaining the symmetrical form of the embroidered letter or other design during the processes of sale and transportation, and for convenience and facility in applying said letter or design upon the article to be permanently adorned thereby.

I have found in practice that a temperature of about 110 degrees Fahr. is sufficient to render the acid treated mount tender so that it can be readily removed from the embroidery after serving its stated purpose, this acid and heat treatment providing a mount which answers admirably all the functions of a temporary vehicle whereby the embroidery can be handled in commerce and conveniently and properly applied by the user.

Having thus described my invention, what I claim as new and desire to secure by Letters Patent, is:

1. A new article of manufacture comprising an acid and heat treated temporary mount of textile material having a design embroidered thereon, said mount being of such consistency that while it is readily disintegrable, it will serve as a form retaining vehicle for the embroidered design until the latter is secured upon a permanent mount, said temporary mount then being readily separated from the embroidered design and permanent mount.

2. A new article of manufacture to be sold in commerce, comprising a chemically tenderized temporary mount of cloth having a design embroidered thereon, said mount being of such consistency after tenderization that while it is readily disintegrable, it will serve as a form retaining vehicle for the embroidered design during marketing and until the embroidered design is secured on a permanent mount, whereupon said tenderized mount may be readily separated from the embroidered design and permanent mount.

In testimony whereof I have signed my name to this specification.

ARNOLD STERN.

Copies of this patent may be obtained for five cents each, by addressing the "Commissioner of Patents, Washington, D. C."